US012526492B2

(12) United States Patent
Hassan et al.

(10) Patent No.: US 12,526,492 B2
(45) Date of Patent: Jan. 13, 2026

(54) MODIFYING OPERATION OF SENSORS USING COLLECTED SENSOR DATA

(71) Applicant: Microsoft Technology Licensing, LLC, Redmond, WA (US)

(72) Inventors: Amer Aref Hassan, Kirkland, WA (US); Mahendra D. Sekaran, Sammamish, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 18/011,800

(22) PCT Filed: May 5, 2021

(86) PCT No.: PCT/US2021/030841
§ 371 (c)(1),
(2) Date: Dec. 20, 2022

(87) PCT Pub. No.: WO2022/015396
PCT Pub. Date: Jan. 20, 2022

(65) Prior Publication Data
US 2023/0254554 A1    Aug. 10, 2023

(30) Foreign Application Priority Data
Jul. 17, 2020  (LU) ........................................ 101928

(51) Int. Cl.
*H04N 23/23* (2023.01)
*G08B 13/19* (2006.01)
(Continued)

(52) U.S. Cl.
CPC ........... *H04N 23/23* (2023.01); *G08B 13/191* (2013.01); *G08B 13/19602* (2013.01); *G08B 13/19667* (2013.01)

(58) Field of Classification Search
None
See application file for complete search history.

(56) References Cited

U.S. PATENT DOCUMENTS

| 5,980,123 A | 11/1999 | Heifler |
| 7,942,314 B1 | 5/2011 | Grimm et al. |

(Continued)

FOREIGN PATENT DOCUMENTS

| CN | 103680004 A | 3/2014 | |
| CN | 205037502 | * 2/2016 | ............. F24F 11/00 |

(Continued)

OTHER PUBLICATIONS

Communication under Rule 71(3) Received for European Application No. 21726308.6, mailed on Apr. 23, 2024, 09 pages.
(Continued)

*Primary Examiner* — Beniyam Menberu
(74) *Attorney, Agent, or Firm* — Schwegman Lundberg & Woessner, P.A.

(57) ABSTRACT

Techniques for modifying operation of sensors using collected sensor data are provided herein. Sensor data describing a physical environment of a user authorized to access an access-controlled resource is collected according to an initial mode of operation. The initial mode of operation defines an initial performance for at least one sensor used to collect the sensor data. In response to detecting presence of a different user in the physical environment of the authorized user based on the sensor data, the at least one sensor is switched from the initial mode of operation to a modified mode of operation. The modified mode of operation is different than the initial mode of operation and defines a revised performance for the at least one sensor used to collect the sensor data.

19 Claims, 7 Drawing Sheets

(51) Int. Cl.
  *G08B 13/191* (2006.01)
  *G08B 13/196* (2006.01)
  *H04L 67/54* (2022.01)
  *H04W 12/06* (2021.01)

(56) References Cited

U.S. PATENT DOCUMENTS

| | | | |
|---|---|---|---|
| 8,354,928 B2 | 1/2013 | Morcom | |
| 8,907,282 B2 | 12/2014 | Pickett et al. | |
| 8,934,020 B2 | 1/2015 | Wang et al. | |
| 2004/0008773 A1* | 1/2004 | Itokawa | G08B 13/19689 348/E7.086 |
| 2013/0135468 A1 | 5/2013 | Kim et al. | |
| 2014/0075528 A1* | 3/2014 | Matsuoka | H04L 63/102 726/7 |
| 2014/0253678 A1 | 9/2014 | Tocher et al. | |
| 2014/0283016 A1* | 9/2014 | Sambamurthy | H04W 12/069 726/19 |
| 2015/0244991 A1* | 8/2015 | Noda | H04N 23/661 348/158 |
| 2015/0312535 A1 | 10/2015 | Borger et al. | |
| 2015/0358537 A1* | 12/2015 | Mirza | H04N 21/2543 348/231.99 |
| 2016/0042520 A1 | 2/2016 | Taneja et al. | |
| 2017/0300847 A1 | 10/2017 | Jones et al. | |
| 2019/0332871 A1* | 10/2019 | Sudarsan | G08B 13/19686 |
| 2020/0139931 A1* | 5/2020 | Mukasa | H04N 23/651 |
| 2021/0063120 A1* | 3/2021 | Taveniku | G06V 10/764 |
| 2021/0362680 A1* | 11/2021 | Moeller | G08B 29/188 |

FOREIGN PATENT DOCUMENTS

| | | | | |
|---|---|---|---|---|
| DE | 202006013315 | * | 11/2006 | G03B 17/56 |
| JP | 2000253390 A | | 9/2000 | |
| JP | 2004056473 A | | 2/2004 | |
| JP | 2006013721 A | | 1/2006 | |
| JP | 2012095017 | * | 5/2012 | H04M 9/00 |
| JP | 2020077330 | * | 5/2020 | G08B 13/196 |

OTHER PUBLICATIONS

"Search Report and Written Opinion Issued in Luxembourg Application No. LU101928", Mailed Date: Dec. 18, 2020, 10 Pages.
"Written Opinion Issued in PCT Application No. PCT/US21/030841", Mailed Date: Sep. 20, 2021, 8 Pages.
"International Search Report and Written Opinion Issued in PCT Application No. PCT/US21/030841", Mailed Date: Jul. 28, 2021, 12 Pages.
First Office Action Received for Chinese Application No. 202180060699.9, mailed on Jun. 13, 2025, 15 pages. (English Translation Provided).
Decision to Grant Article 97 (1) Received for European Application No. 21726308.6, mailed on Aug. 1, 2024, 02 pages.
Notice of Grant Received for Chinese Application No. 202180060699.9, mailed on Nov. 3, 2025, 04 pages. (English Translation Provided).

* cited by examiner

400 ⤴

DETECT PRESENCE OF AN UNAUTHORIZED USER IN THE SURROUNDING ENVIRONMENT BASED ON SENSOR DATA
402

↓

CAUSE A SENSOR TO SWITCH FROM AN INITIAL MODE OF OPERATION TO A MODIFIED MODE OF OPERATION TO COLLECT SENSOR DATA
404

↓

DETERMINE THAT THE UNAUTHORIZED USER IS NO LONGER IN THE SURROUNDING ENVIRONMENT BASED ON THE SENSOR DATA
406

↓

CAUSE THE SENSOR TO REVERT FROM THE MODIFIED MODE OF OPERATION TO THE INITIAL MODE OF OPERATION TO COLLECT SENSOR DATA
408

*FIG. 4*

MODIFYING OPERATION OF SENSORS USING COLLECTED SENSOR DATA

This application is a U.S. National Stage Filing under 35 U.S.C. 371 of International Patent Application Serial No. PCT/US2021/030841, filed May 5, 2021, and published as WO 2022/015396 A1 on Jan. 20, 2022, which application claims the benefit of priority to Luxembourg Patent Application No. 101928, filed Jul. 17, 2020, which applications and publication are incorporated herein by reference in their entirety.

TECHNICAL FIELD

An embodiment of the present subject matter relates generally to sensors and, more specifically, to modifying operation of sensors using collected sensor data.

BACKGROUND

Sensors are commonly used to monitor a physical environment. For example, security cameras are often installed around buildings to monitor for intruders. The captured video can be used to alert a user, such as a homeowner or security guard of a current issue, such as an attempted break-in, and/or to provide evidence of a past issue. For example, a storeowner that suspects that items have been stolen may review the video to determine the person or cause of the missing items. In either case, managing resource usage in relation to collecting the sensor data can be problematic. For example, continuously capturing video results in large amounts of video data, which is difficult to store and/or transfer to other locations. Current techniques capture low resolution video data to reduce the size of the collected data, however this results in lower quality video. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 is a flowchart showing a method for reverting operation of sensors using collected sensor data, according to certain example embodiments.

DETAILED DESCRIPTION

Figure 1:
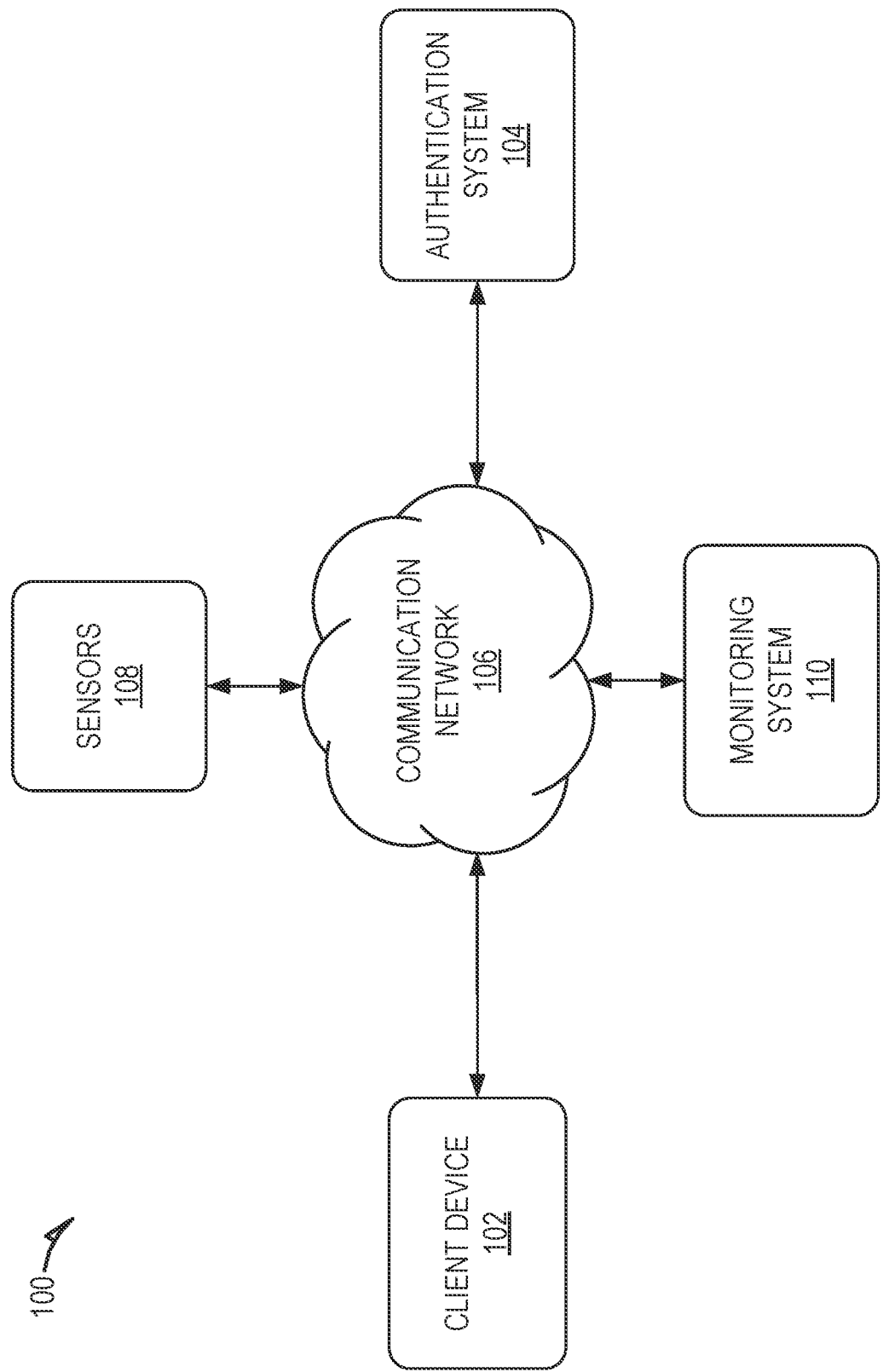
FIG. 1 is a block diagram illustrating an example system for modifying operation of sensors using collected sensor data, in accordance with some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for modifying operation of sensors using collected sensor data. An authentication system is used to restrict access to access-controlled resources. An access-controlled resource is any type of physical or digital object, account, area, service, applications, portions of an application, digital services, digital media, and the like, that is meant to be restricted to a set of authorized users. An access-controlled resource may be associated with an authentication requirement that limits access to the access-controlled resource to the set of authorized users. That is, the authentication requirement is used to allow authorized users to access the access-controlled resource while restricting unauthorized users from accessing the access-controlled resource.

An example of an access-controlled resource is an email account facilitated by an online service. An authentication requirement, such as requiring a user to provide authentication credentials (e.g., a username and password associated with the email account) associated with the email account can be used to restrict access to the email account to authorized users. For example, an authorized user can provide the username and password to access the email account, while an unauthorized user that does not have knowledge of the username and password cannot access the email account. As another example, an access-controlled resource may be a digital file or set of digital files. An authentication requirement, such as prompting a user for a username and password, can be used to restrict access to the digital file or set of digital files to authorized users, such as a set of designated employees of a company. As another example, an access-controlled resource may be a server room located within a building. An authentication requirement, such as requiring a user to enter a code, can be used to limit access to the server room to authorized users. For example, authorized users can use the code to access the server room, while unauthorized users that do not know the code cannot access the server room. As another example, an access-controlled resource may be an exam that is administered in person or online. An authentication requirement, such as requiring a user to provide a username/password and/or government issued identification card may be used to ensure that the appropriate user is taking the test.

To further protect an access-controlled resource, sensor data describing the physical environment surrounding an authorized user may be collected to detect the presence of unauthorized users. For example, sensor data can be collected while an authorized user is using an Automated Teller Machine (ATM) to detect the presence of unauthorized users that are potentially dangerous to the authorized user. As another example, sensor data can be collected while an authorized user is taking an online exam to ensure that the authorized user (e.g., test taker) is not eliciting the help of other unauthorized users during the exam.

Sensor data can be collected according to various modes of operation. A mode of operation defines the performance of the available sensors when collecting sensor data, as well how the collected sensor data is to be stored and/or otherwise processed. For example, a mode of operation may define the individual sensors to be used to collect sensor data, the positioning and/or view (e.g., zoom level) of the sensor, a quality or resolution at which the sensor data is to be gathered, whether the sensor data is to be stored, a duration at which the sensor data is to be stored, whether the sensor data is to be transmitted to another device, and the like.

The mode of operation used for collecting sensor data can be automatically modified based on the sensor data that is collected, such as upon detecting the presence of an unauthorized user in the physical environment surrounding the authorized user. For example, an initial mode of operation used to collect the sensor data can be modified to a modified mode of operation that provides an increase to the resolution at which sensor data is collected, adjusts the position and/or view of the sensors to better capture the unauthorized user, uses additional sensors to capture sensor data, stores the captured sensor data in a memory, transmits the captured sensor data to a designated network location, and the like. Similarly, the modified mode of operation can be modified in response to determining that that the unauthorized user is no longer in the physical environment of the authorized user. For example, the modified mode of operation may be reverted back to the initial mode of operation that was in use prior to detection of the unauthorized user.

Adjusting the mode of operation used to collect sensor data provides for reduced resource usage without a sacrifice in performance. For example, sensor data may be collected according to an initial mode of operation that conserves computing resources and be adjusted to a modified mode of operation that provides a heightened level of performance upon detection of the presence of an unauthorized user in the physical environment of the authorized user, such as by increasing the resolution, using additional sensors, and the like. This allows for heightened performance when collecting valuable sensor data (e.g., when an unauthorized user is detected within the physical environment of the authorized user) while providing resource conserving performance when collecting less valuable sensor data (e.g., when there are no unauthorized users detected in the physical environment of the authorized user).

Any of a variety of types of sensors can be used to collect sensor data, such as optical sensors (e.g., cameras), audio sensors (e.g., microphones), infrared sensors, movement sensors, and the like. Accordingly, each mode of operations may also use any number of sensors and/or combination of sensors. For example, one mode of operation may use an optical, audio and infrared sensor. As another, example, a mode of operation may use only an optical and infrared sensor.

In addition to adjusting the mode of operation for collecting sensor data, additional actions may also be performed based on the collected sensor data. For example, access to the access-controlled resource may be restricted while the unauthorized user is detected in the physical environment of the authorized user. Restricting access to the access-controlled resource may include closing a user interface window that is presenting sensitive information, obfuscating sensitive data, halting access to the access-controlled resource (e.g., locking a door), and the like. As another example, an alert may be presented to the authorized user indicating that an unauthorized has been detected. As another example, a notification may be transmitted to alert a designated third-party user that an unauthorized user has been detected. As another example, the authorized user may be provided with a distress button configured to alert the proper authorities, restrict access to the access-controlled resource, sound an alarm, and the like.

Adjusting the mode of operation of the sensors provides a technical solution to the technical problem of managing resource usage when collection sensor data as well as collecting high quality sensor data. Specifically, an initial mode of operation configured to reduce resource usage can be used when unauthorized users are not detected in the physical environment surrounding the authorized user. For example, sensor data can be captured at a relatively lower resolution, using less sensors, and the like. Similarly, the sensor data may be processed in a manner that reduces resource usage, such as be storing less sensor data, not storing sensor data, retaining sensor data for a shorter period of time, not generating metadata, and the like. Use of the initial mode allows for resource usage to be reduced while unauthorized users are not detected and the primary goal of sensor data may simply be detection of unauthorized user. Upon detecting an unauthorized user, however, the mode of operation may be modified to modified mode of operation that provided higher quality performance, such as by capturing sensor data using additional sensors, higher resolution, and the like. Accordingly, higher performance that is likely to be resource intensive is used when the collected sensor data is most valuable (e.g., when an unauthorized user is detected), whereas resource conserving performance is used when the collected sensor data is likely less valuable (e.g., when an unauthorized user is not detected).

FIG. 1 is a block diagram illustrating an example system 100 for modifying operation of sensors 108 using collected sensor data, in accordance with some example embodiments. As shown, the system 100 includes a client device 102, authentication system 104, sensors 108, and a monitoring system 110 connected to a communication network 106 and configured to communicate with each other through use of the communication network 106. The communication network 106 is any type of network, including a local area network (LAN), such as an intranet, a wide area network (WAN), such as the Internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (IoT) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module running on the computing device. The communication interface also sends a communication to another computing device in network communication with the computing device.

The authentication system 104 manages access to an access-controlled resource. An access-controlled resource is any type of physical or digital object, account, area, service, and the like, that is meant to be restricted to a set of authorized users. An access-controlled resource may be associated with an authentication requirement that limits access to the access-controlled resource to the set of authorized users. The authentication system 104 enforces the authentication requirement to allow authorized users to access the access-controlled resource while restricting unauthorized users from accessing the access-controlled resource. An authentication requirement is satisfied by providing a correct authentication credential. For example, an authentication requirement may be providing a correct authentication credential such as a code, password or combination of a username and password. As another example, authentication requirement may be providing a correct authentication credential such as specified identifying information (e.g., social security number, mother's maiden name, bank account balance, etc.), answer to personal question, etc.

One example of an access-controlled resource is an email account that is associated with an authentication requirement of providing a correct username and password associated with the email account. Another example of an access-controlled resource is a digital file associated with an authentication requirement of providing a correct password. Other examples of an access-controlled resource include a physical room that is associated with an authentication requirement of providing a correct code to access and an exam associated with an authentication requirement of providing a username/password and/or acceptable form of identification.

Users communicate with the authentication system 104 to request access to an access-controlled resource by using the client device 102 that is connected to the communication network 106 by direct and/or indirect communication. For example, the user uses the client device 102 to provide an authentication credential (e.g., password, code, username/password, etc.) to the authentication system 104. The authentication system 104 determines whether the received authentication credential satisfies the authentication requirement and, if so, approves the authentication request. For example, the authentication system 104 provides the authorized user with access to the access-controlled resource or notifies an online service (e.g., email service, banking service, etc.) utilizing the functionality of the authentication system 104 that the authorized user has satisfied the authentication requirement.

Although the shown system 100 includes only one client device 102, this is for ease of explanation and is not meant to be limiting. One skilled in the art would appreciate that the system 100 can include any number of client devices 102. Further, the authentication system 104 may concurrently accept connections from and interact with any number of client devices 102. The authentication system 104 may support connections from a variety of different types of client devices 102, such as desktop computers; mobile computers; mobile communications devices, e.g., mobile phones, smart phones, tablets; smart televisions; set-top boxes; keypads; and/or any other network enabled computing devices. Hence, the client device 102 may be of varying type, capabilities, operating systems, and so forth.

Further, although the client device 102 and the authentication system 104 are shown as separate entities, this is only one possible embodiment. In other embodiments, the client device 102 and the authentication system 104 are incorporated as a single device. For example, a keypad placed near a door may perform the functionality of both a client device 102 and the authentication system 104. For example, a user may use the keypad to enter an authentication credential, such as a password, to gain access to a room protected by the door. The keypad may perform the functionality of the authentication system 104 by determining whether to approve the authentication request (e.g., determining whether the entered authentication credential satisfies the authentication requirement). These examples, as well as others, need not require the use of the communication network 106, but may use direct communication between the client device 102 and the authentication system 104 (or when embodied in a single device, may communicate as components of the single device).

In some embodiments, a user may interact with the authentication system 104 via a client-side application installed on the client device 102. In some embodiments, the client-side application includes a component specific to the authentication system 104 or an online service (not shown) utilizing the functionality of the authentication system 104 to manage access to access-controlled resources. For example, the component may be a stand-alone application, one or more application plug-ins, and/or a browser extension. However, the users may also interact with the authentication system 104 via a third-party application, such as a web browser, that resides on the client device 102 and is configured to communicate with the authentication system 104 or an online service (not shown) utilizing the functionality of the authentication system 104. In either case, the client-side application presents a user interface (UI) for the user to interact with the authentication system 104. For example, the user interacts with the authentication system 104 via a client-side application integrated with the file system or via a webpage displayed using a web browser application.

As part of an authentication request (e.g., a user attempting the access the access-controlled resource), a user provides an authentication credential (e.g., username/password, code, etc.) to the authentication system 104 to satisfy the authentication requirement enforced by the authentication system 104. The authentication requirement is enforced to limit access to the access-controlled resource. The authentication system 104 approves or denies the authentication request based on whether the received authentication credential satisfies the authentication requirement. For example, the authentication system 104 compares the received authentication credential to a stored authentication credential associated with the access-controlled resource to determine whether the received authentication credential matches the stored authentication credential or meets a similarity threshold with the stored authentication credential.

The authentication system 104 approves the authentication request if the authentication credential provided by the user satisfies the authentication requirement. Alternatively, the authentication system 104 denies the authentication request if the authentication credential provided by the user does not satisfy the authentication requirement.

The authentication requirement enforced by the authentication system 104 restricts unauthorized users from initially accessing an access-controlled resource, however, does not protect the access-controlled resource after the access-controlled resources has been accessed by an authorized user. Unauthorized users may therefore attempt to access an access-controlled resource after it has been accessed by an authorized user (e.g., an authorized user has met the authentication requirement). For example, an unauthorized user may attempt to view sensitive account data presented on a screen of an authorized user, attack an authorized user that has entered their password at an ATM, provide an authorized user with assistance during an exam, and the like.

The monitoring system 110 protects against these types of scenarios by collecting sensor data describing the physical environment of an authorized user to detect the presence of unauthorized users. For example, the monitoring system 110 may collect the sensor data while an authorized user is provided with access to an access-controlled resource, such as while the authorized user is using an ATM, logged into an email account, taking an exam, within a secured physical location, and the like.

The monitoring system 110 may collect sensor data using one or more sensors 108 connected to the communication network 106. Although the sensors 108, monitoring system 110, client device 102 and authentication system 104 are shown as being separate entities, this is only one example and is not meant to be limiting. The sensors 108, monitoring system 110, client device 102 and authentication system 104 may be embodied within one or more devices. For example, the monitoring system 110 and/or sensors 108 may be incorporated, partially or completely, within the client device 102. For example, the client device 102 may be a laptop computer or smart phone that is equipped with multiple sensors 108, such as cameras, microphones, and the like. As another example, the sensors 108 may include a combination of sensors 108 incorporated within the client device 102 and sensors 108 that are independent of the client device 102. For example, the sensors 108 may include a microphone included within a client device 102, such as a laptop computer, and a camera that is independent of the client device 102.

The monitoring system 110 may collect the sensor data according to various modes of operation. A mode of operation defines the performance the available sensors 108 when collecting sensor data, as well how the collected sensor data is to be stored and/or otherwise processed by the monitoring system 110. For example, a mode of operation may define the individual sensors 108 to be used to collect sensor data, the positioning and/or view (e.g., zoom level) of each sensor 108, a quality or resolution at which each sensor 108 is to gather sensor data, whether the sensor data is to be stored, a duration at which the sensor data is to be stored, whether the sensor data is to be transmitted to another device, and the like.

The monitoring system 110 modifies the mode of operation used for collecting sensor data based on the sensor data that is collected. For example, the monitoring system 110 may modify the mode of operation in response to detecting the presence of an unauthorized user in the physical environment of the authorized user. This allows the monitoring system 110 to increase the resolution at which sensor data is collected, adjust the position and/or view of the sensors 108 to better capture the unauthorized user, use additional sensors 108 to capture sensor data, store the captured sensor data in a memory, transmits the captured sensor data to a designated network location, and the like. Similarly, the monitoring system 110 may modify the mode of operation in response to determining that that the unauthorized user is no longer in the physical environment of the authorized user. For example, the monitoring system 110 may modify the mode of operation to a previous mode of operation that was in use prior to detection of the unauthorized user.

By adjusting the mode of operation used to collect sensor data, the monitoring system 110 provides for reduced resource usage and high-quality performance. For example, the monitoring system 110 may collect sensor data according to an initial mode of operation that conserves computing resources and adjust the mode of operation to a heightened level of performance upon detection of the presence of an unauthorized user in the physical environment of the authorized user, such as by increasing the resolution, using additional sensors 108, and the like. This allows for the monitoring system 110 to provide heightened performance when collecting valuable sensor data (e.g., when an unauthorized user is detected within the physical environment of the authorized user) while providing resource conserving performance when collecting less valuable sensor data (e.g., when there are no unauthorized users detected in the physical environment of the authorized user).

Any of a variety of types of sensors 108 can be used to collect sensor data, such as optical sensors (e.g., cameras), audio sensors (e.g., microphones), infrared sensors, and the like. Accordingly, each mode of operations may also use any number of sensors 108 and/or combination of sensors 108. For example, one mode of operation may use optical, audio and infrared sensors 108, while another mode of operation may use only optical and infrared sensors 108.

In addition to adjusting the mode of operation for collecting sensor data, the monitoring system 110 may also perform additional actions based on the collected sensor data. For example, the monitoring system 110 may restrict access to the access-controlled resource while the unauthorized user is detected in the physical environment of the authorized user. Restricting access to the access-controlled resource may include closing a user interface window that is presenting sensitive information, obfuscating sensitive data, halting access to the access-controlled resource (e.g., locking a door), and the like. As another example, the monitoring system 110 may present an alert to the authorized user indicating that an unauthorized has been detected. As another example, the monitoring system 110 may transmit a notification to a designated third-party user indicating that an unauthorized user has been detected. As another example, the monitoring system 110 may provide the authorized user with a distress button enabling the authorized user to alert the proper authorities, restrict access to the access-controlled resource, sound an alarm, and the like.

Figure 2:
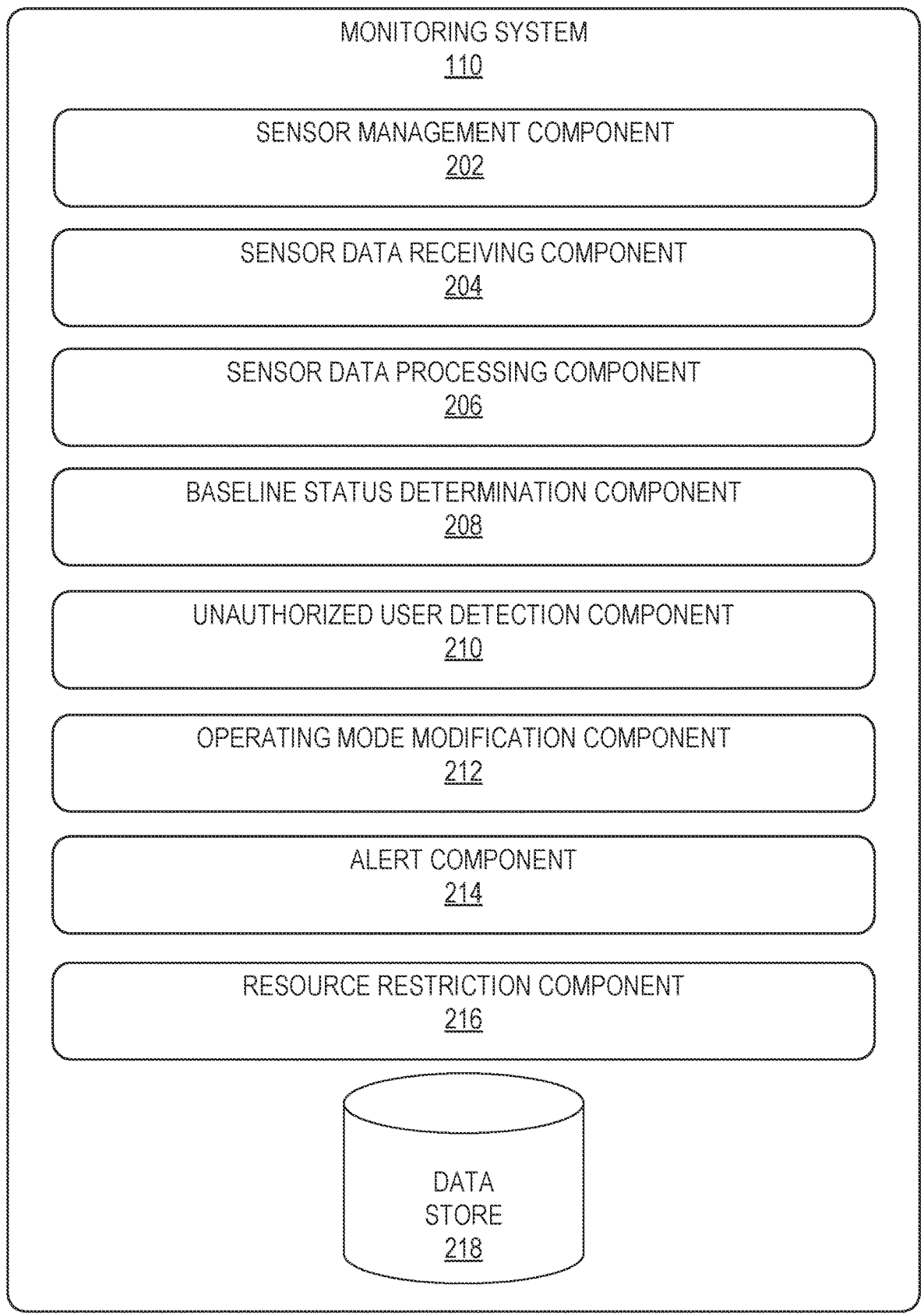
FIG. 2 is a block diagram of a monitoring system, according to some example embodiments.

FIG. 2 is a block diagram of a monitoring system 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the monitoring system 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the monitoring system 110 includes a sensor management component 202, a sensor data receiving component 204, a sensor data processing component 206, a baseline status determination component 208, an unauthorized user detection component 210, an operation mode modification component 212, an alert component 214, a resource restriction component 216, and a data store 218.

The sensor management component 202 manages performance of the sensors 108. For example, the sensor management component 202 may communicate with multiple sensors 108 to initiate, modify, and/or stop use of the sensors 108. The sensor management component 202 transmits commands to the individual sensors 108 to cause a specified action by the sensor 108. For example, the sensor management component 202 may transmit a command to a sensor 108 to cause the sensor 108 to begin collecting sensor data. As another example, the sensor management component 202 may transmit a command to a sensor 108 to cause the sensor 108 to modify a configuration of the sensor when collecting sensor data, such as by increasing or decreasing the resolution at which the sensor 108 is capturing sensor data, changing a view or position of the sensor 108 (e.g., zooming in/out, moving left/right), and the like. As another example, the sensor management component 202 may transmit a command to a sensor 108 to cause the sensor 108 to stop collecting sensor data.

The sensor management component 202 may cause the various sensors 108 to operate based on a specified mode of operation of the monitoring system 110. A mode of operation defines performance of the monitoring system 110 for collecting, storing, and/or processing sensor data. For example, a mode of operation may define specified sensors 108 to be used to collect sensor data, as well as the configuration of the sensors 108, such a resolution level, position, view, and the like.

The sensor management component 202 may initially cause the sensors 108 to operate according to an initial mode of operation and modify the performance of the sensors 108 thereafter based on a modified mode of operation. The sensor management component 202 may receive a command from another component of the monitoring system 110 (e.g., the operation mode modification component 212) to modify the performance of the sensors 108 based on a modified mode of operation. In turn, the sensor management component 202 transmits commands to the individual sensors 108 to cause the sensors 108 to operate according to the modified mode of operation. The sensor management component 202 may initially cause the sensors 108 to operate according to an initial mode of operation that provides for reduced resource usage, such as capturing sensor data using a limited number of sensors, capturing sensor data in a lower resolution, and the like. The sensor management component 202 may cause the sensors 108 to modify their performance based on a modified mode of operation when an unauthorized user is detected. For example, the sensor management component 202 may cause the sensors 108 to operate according to a modified mode of operation that provides for higher quality (e.g., using more sensors 108, higher resolution) and/or better captures the detected unauthorized user (e.g., directs the position of a sensor 108 towards the unauthorized user, zoom in or out to better capture the unauthorized user).

The sensor data receiving component 204 receives sensor data collected by the various sensors 108. The sensors 108 may be any of a variety of types of sensors 108 for collecting sensor data. For example, the sensors may include optical sensors that capture images and/or video, audio sensors that capture sound, infrared sensors that capture infrared radiation and/or heat, motion sensors that detect movement, and the like. Accordingly, the sensor data receiving component 204 may receive any of a variety of types of sensors data.

The sensor data processing component 206 processes the sensor data received by the sensor data receiving component 204. Processing the sensor data may includes storing the sensor data, transmitting the sensor data to a designated network destination, generating metadata based on the sensor data, and the like. For example, the sensor data processing component 206 may store a portion or all of the sensor data in the data store 218. As another example, the sensor data processing component 206 may generate metadata describing the sensor data, such as time stamp data describing a time at which the sensor data was collected, the type of sensor data that was collected, data identifying the authorized user, geographic data, sensor 108 that collected the sensor data, and the like.

The sensor data processing component 206 may process the sensor data according to varying modes of operation of the monitoring system 110. For example, the sensor data processing component 206 may process the sensor data according to an initial mode of operation and, upon receiving a command to modify the mode of operation, process the sensor data according to a modified mode of operation.

Processing the sensor data according to varying modes of operation allows the sensor data processing component 206 to achieve varying goals, such as conserving computing resources and/or providing higher quality performance. For example, the sensor data processing component 206 may process data according to an initial mode of operation meant to reduce resource usage when unauthorized users are not detected in the physical environment surrounding the authorized user. If an unauthorized user is detected in the physical environment, the sensor data processing component 206 may be instructed to process sensor data according to a modified mode of operation that provides higher quality performance. For example, the sensor data processing component 206 may begin generating metadata or increase the amount of metadata generated based on the sensor data, increase the amount of metadata that is stored, transmit sensor data and/or metadata to a designated network destination, and the like.

The baseline status determination component 208 determines a baseline status of the physical environment of an authorized user. The baseline status of the physical environment describes the physical environment of the authorized user at or near the time when the authorized user is provided with access to an access-controlled resource. The determined baseline status of the physical environment can be used as a basis for detecting the presence of unauthorized users. For example, the baseline status of the physical environment may identify presence of other users that are present in the physical environment of the authorized user when the authorized user is provided access to the access-controlled resource. These users are likely not unauthorized users that pose a threat to the authorized user. For example, an authorized user using an ATM may be with their child, friend or spouse. Accordingly, the monitoring system 110 can be configured to disregard the presence of these users when determining whether an unauthorized user is present. That is, the presence of the additional users identified in the baseline status will not trigger a detection of an unauthorized user.

The baseline status determination component 208 may determine the baseline status of the physical environment of an authorized user using sensor data collected by the sensors 108. For example, the baseline status determination component 208 may use video, image, sound, and/or infrared data to determine a baseline status of the physical environment. The baseline status determination component 208 may also elicit the authorized user for information describing the physical environment, such as by prompting the user to enter information regarding the number of users that are present.

The unauthorized user detection component 210 determines whether unauthorized users are present in the physical environment of an authorized user based on sensor data collected by the sensors 108. The unauthorized user detection component 210 may use any of a variety and combination of types of sensor data, such as video, image, sound, motion data, and/or infrared data. Further, the unauthorized user detection component 210 may use any of a variety of techniques to detect the presence of an unauthorized user.

In some embodiments, the unauthorized user detection component 210 may determine a value based on the sensor data that indicates a degree or level of a detected change (e.g., movement, sound, heat, etc.) in the physical environment and compare the value to a threshold value to determine whether an unauthorized user is present. For example, the unauthorized user detection component 210 may use sensor data gathered by a motion sensor to determine a movement value indicating a level or degree of a detected movement in the physical environment. Similarly, the unauthorized user detection component 210 may use sensor data gathered by an infrared sensor to determine an infrared radiation value indicating a level or degree of a detected change in infrared radiation in the physical environment. As another example, the unauthorized user detection component 210 may use sensor data collected by multiple sensors 108 (e.g., video camera, microphone, motion sensor, infrared sensor, etc.) to determine an aggregate value indicating a degree or level of a detected change in the physical environment.

In any case, the unauthorized user detection component 210 compares the value determined based on the sensors data to a threshold value to determine whether the detected change indicates presence of an unauthorized user. For example, the unauthorized user detection component 210 determines that an unauthorized user is present when the value exceeds the threshold value and determines that an unauthorized user is not present when the value does not exceed the threshold value.

The unauthorized user detection component 210 may detect the presence of an unauthorized user using other techniques and/or based on other considerations, such as using facial and/or object recognition techniques, voice recognition, shadow recognition or movement, determining the location of the detected change, and the like.

The unauthorized user detection component 210 may notify the other components of the monitoring system 110 when an unauthorized user is detected. Similarly, the unauthorized user detection component 210 may notify the other components of the monitoring system 110 upon determining that the unauthorized user is no longer present in the physical environment. For example, the unauthorized user detection component 210 may notify the operation mode modification component 212, alert component 214, and/or the resource restriction component 216 upon detecting the presence of an unauthorized user and/or that an unauthorized user is not longer detected in the physical environment.

The operation mode modification component 212 causes a change to the operating mode of the monitoring system 110. For example, the operation mode modification component 212 transmits commands to the sensor management component 202 and/or the sensor data processing component 206 to cause the respective component to modify the operating mode at which sensor data is collected and processed. For example, the operation mode modification component 212 may transmit commands to the sensor management component 202 and/or the sensor data processing component 206 to operate according to a modified mode of operation when an unauthorized user is detected in the physical environment. As another example, the operation mode modification component 212 may transmit commands to the sensor management component 202 and/or the sensor data processing component 206 to revert operation to an initial mode of operation when the unauthorized user is no longer detected in the physical environment.

The alert component 214 performs specified alerting actions in response to detection of an unauthorized user. For example, the alert component 214 may cause presentation of an alert notification to the authorized user, such as by presenting the alert notification on a display of the client device 102, sounding an alarm, and the like. The alert component 214 may also transmit a notification to a specified network destination, such as a computing device associated with a security guard, police office, testing official, and the like. The notification may include data indicating that an unauthorize user has been detected as well as collected sensor data and/or metadata generated from the sensor data used to detect the unauthorized user. For example, the notification can include an image, video, and/or audio data as well as metadata such as a time at which the sensor data was collected.

In some embodiments, the alert component 214 may enable the authorized user to manually cause any of the above described functionality. For example, the alert component 214 may present the authorized user with an alert button that the is selectable by the authorized user to cause any of the described functionality, such as sounding an alarm, notifying security or the police, and the like. The alert button may be presented as a user interface element, such as a button, on a display of the client device 102. The authorized user may actuate the alert button, such as by clicking or tapping the alert button, to cause the associated functionality.

The resource restriction component 216 places a restriction on an access-controlled resource in response to detection of an unauthorize user. For example, the resource restriction component 216 may cause a window including sensitive information to close, cause an application to terminate, cause a user to be logged out of an account, obfuscate sensitive data, cause a door to lock, and the like. The resource restriction component 216 may remove the restriction on the access-controlled resource in response to a determination that the unauthorized user is no longer in the physical environment. For example, the resource restriction component 216 may log the authorized user into an account, reopen windows presenting sensitive data, clarify obfuscated data, unlock a door, and the like.

Figure 3:
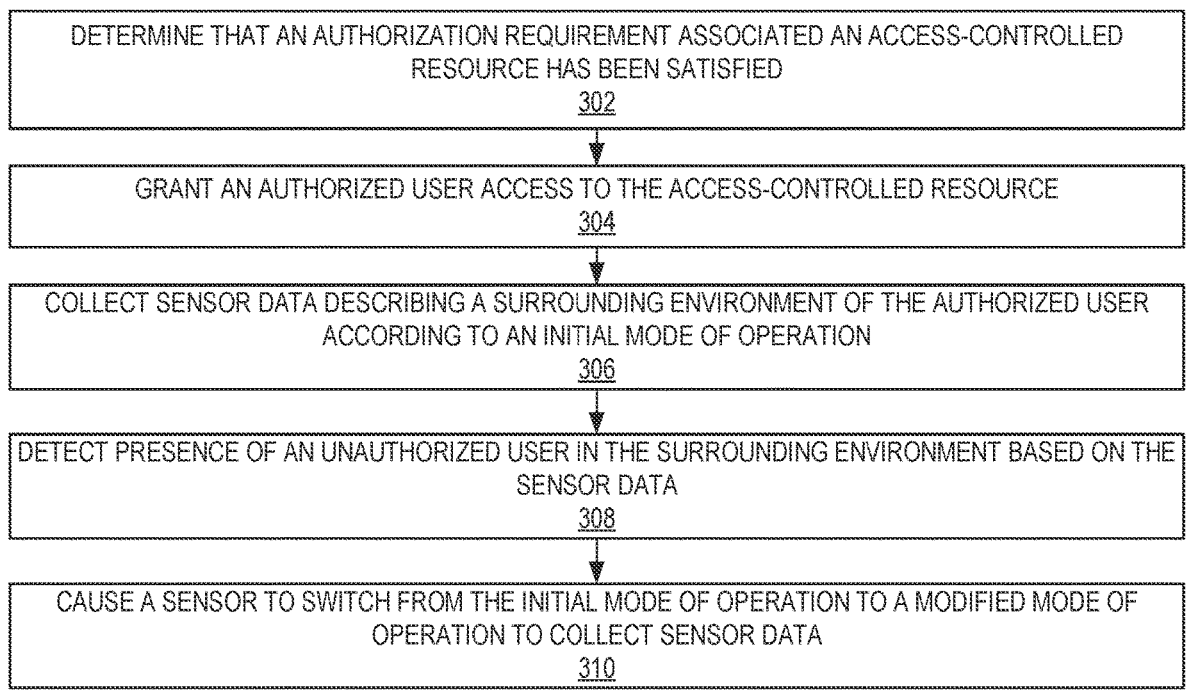
FIG. 3 is a flowchart showing a method for modifying operation of sensors using collected sensor data, according to certain example embodiments.

FIG. 3 is a flowchart showing a method 300 for modifying operation of sensors using collected sensor data, according to certain example embodiments. The method 300 may be embodied in computer readable instructions for execution by one or more processors such that the operations of the method 300 may be performed in part or in whole using the system 100 shown in FIG. 1; accordingly, the method 300 is described below by way of example with reference thereto. However, it shall be appreciated that at least some of the operations of the method 300 may be deployed on various other hardware configurations and the method 300 is not intended to be limited to the system 100 shown in FIG. 1.

At operation 302, the authentication system 104 determines that an authorization requirement associated with an access-controlled resource has been satisfied. Users communicate with the authentication system 104 to request access to an access-controlled resource. For example, the user uses a client device 102 to provide an authentication credential (e.g., password, code, username/password, etc.) to the authentication system 104. The authentication system 104 determines whether the received authentication credential satisfies the authentication requirement and, if so, approves the authentication request.

At operation 304, the authentication system 104 grants an authorized user access to the access-controlled resource. For example, the authentication system 104 provides the requesting user with access to the access-controlled resource or notifies an online service (e.g., email service, banking service, etc.) utilizing the functionality of the authentication system 104 that the user has satisfied the authentication requirement.

At operation 306, the sensor data receiving component 204 collects sensor data describing a physical environment of the authorized user according to an initial mode of operation. The sensor data receiving component 204 receives sensor data collected by the various sensors 108. The sensors 108 may be any of a variety of types of sensors 108 for collected sensor data. For example, the sensors may include optical sensors that capture images and/or video, audio sensors that capture sound, infrared sensors that capture infrared radiation and/or heat, and the like. The initial mode of operation may be configured to conserve computing resources, such as by collecting sensor data at a lower resolution, storing and or otherwise processing the sensor data at a reduces level, and the like. In some embodiments, the initial mode of operation may include the use of an optical sensor to capture video and/or images as well as an infrared sensor to capture infrared radiation and/or heat.

At operation 308, the unauthorized user detection component 210 detects presence of an unauthorized user in the physical environment based on the sensor data. The unauthorized user detection component 210 may use any of a variety and combination of types of sensor data, such as video, image, sound, motion data, and/or infrared data. Further, the unauthorized user detection component 210 may use any of a variety of techniques to detect the presence of an unauthorized user, such as CNN, r-CNN, full CNN, mask R-CNN; single shot multibox detector, edge finding (such as difference of Gaussians); VGG-16, and the like.

In some embodiments, the unauthorized user detection component 210 may determine a value based on the sensor data that indicates a degree or level of a detected change in the physical environment and compare the value or values to a threshold value to determine whether an unauthorized user is present. For example, the unauthorized user detection component 210 may use sensor data gathered by a motion sensor to determine a movement value indicating a level or degree of a detected movement in the physical environment. Similarly, the unauthorized user detection component 210 may use sensor data gathered by an infrared to determine an infrared radiation value indicating a level or degree of a detected change in infrared radiation in the physical environment. As another example, the unauthorized user detection component 210 may use sensor data collected by multiple sensors 108 (e.g., video camera, microphone, motion sensor, infrared sensor, etc.) to determine an aggregate value indicating a degree or level of a detected change in the physical environment.

In any case, the unauthorized user detection component 210 compares the value determined based on the sensors data to a threshold value to determine whether the detected change indicates presence of an unauthorized user. For example, the unauthorized user detection component 210 determines that an unauthorized user is present when the value exceeds the threshold value and determines that an unauthorized user is not present when the value does not exceed the threshold value.

At operation 310, the operation mode modification component 212 causes a sensor 108 to switch from the initial mode of operation to a modified mode of operation to collect sensor data. For example, the sensor can be adjusted to a modified mode of operation that provides a heightened level of performance, such as by increasing the resolution, using additional sensors, and the like. This allows for heightened performance when collecting valuable sensor data (e.g., when an unauthorized user is detected within the physical environment of the authorized user) while providing resource conserving performance when collecting less valuable sensor data (e.g., when there are no unauthorized users detected in the physical environment of the authorized user).

FIG. 4 is a flowchart showing a method 400 for reverting operation of sensors using collected sensor data, according to certain example embodiments. The method 400 may be embodied in computer readable instructions for execution by one or more processors such that the operations of the method 400 may be performed in part or in whole by the system 100 shown in FIG. 1; accordingly, the method 400 is described below by way of example with reference thereto. However, it shall be appreciated that at least some of the operations of the method 400 may be deployed on various other hardware configurations and the method 400 is not intended to be limited to the system 100 shown in FIG. 1.

At operation 402, the unauthorized user detection component 210 detects presence of an unauthorized user in the physical environment based on the sensor data. The unauthorized user detection component 210 may use any of a variety and combination of types of sensor data, such as video, image, sound, motion data, and/or infrared data. Further, the unauthorized user detection component 210 may use any of a variety of techniques to detect the presence of an unauthorized user.

In some embodiments, the unauthorized user detection component 210 may determine a value based on the sensor data that indicates a degree or level of a detected change in the physical environment and compare the value or values to a threshold value to determine whether an unauthorized user is present. For example, the unauthorized user detection component 210 may use sensor data gathered by a motion sensor to determine a movement value indicating a level or degree of a detected movement in the physical environment. Similarly, the unauthorized user detection component 210 may use sensor data gathered by an infrared sensor to determine a to determine an infrared radiation value indicating a level or degree of a detected change in infrared radiation in the physical environment. As another example, the unauthorized user detection component 210 may use sensor data collected by multiple sensors 108 (e.g., video camera, microphone, motion sensor, infrared sensor, etc.) to determine an aggregate value indicating a degree or level of a detected change in the physical environment.

In any case, the unauthorized user detection component 210 compares the value determined based on the sensors data to a threshold value to determine whether the detected change indicates presence of an unauthorized user. For example, the unauthorized user detection component 210 determines that an unauthorized user is present when the value exceeds the threshold value and determines that an unauthorized user is not present when the value does not exceed the threshold value.

At operation 404, the operation mode modification component 212 causes a sensor to switch from an initial mode of operation to a modified mode of operation to collect sensor data. For example, the sensor can be adjusted to a modified mode of operation that provides a heightened level of performance, such as by increasing the resolution, using additional sensors, and the like. This allows for heightened performance when collecting valuable sensor data (e.g., when an unauthorized user is detected within the physical environment of the authorized user) while providing resource conserving performance when collecting less valuable sensor data (e.g., when there are no unauthorized users detected in the physical environment of the authorized user).

At operation 406, the unauthorized user detection component 210 determines that the unauthorized user is no longer in the physical environment based on the sensor data. For example, the unauthorized user detection component 210 may determine that a detected change in the physical environment is no longer present and/or that a value determined based on updates sensor data is below the threshold value.

At operation 408, the operation mode modification component 212 causes the sensor to revert from the modified mode of operation to the initial mode of operation to collect sensor data. For example, the sensor 108 can be adjusted to the initial mode of operation that provides resource conserving performance.

Figure 5:
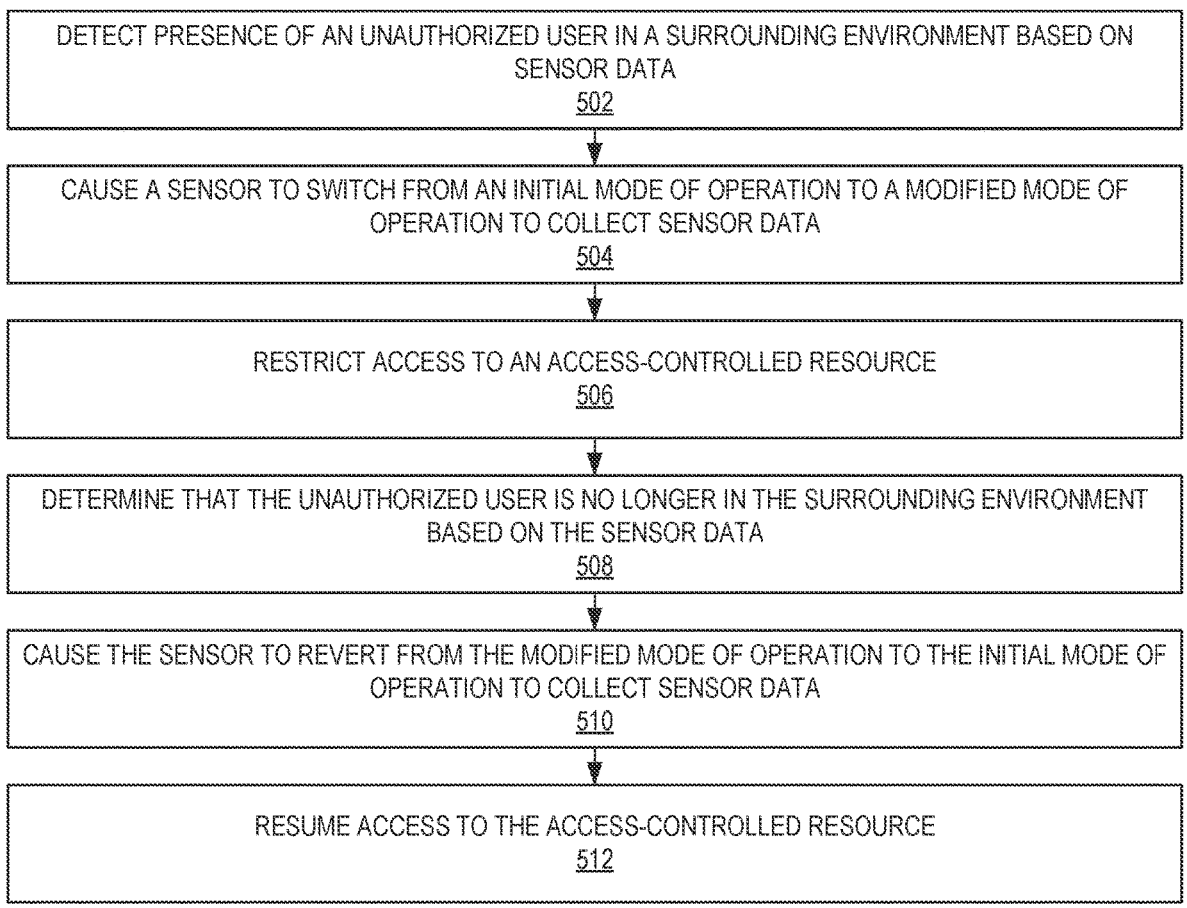
FIG. 5 is a flowchart showing a method for executing an action using collected sensor data, according to certain example embodiments.

FIG. 5 is a flowchart showing a method 500 for executing an action using collected sensor data, according to certain example embodiments. The method 500 may be embodied in computer readable instructions for execution by one or more processors such that the operations of the method 500 may be performed in part or in whole by the monitoring system 110; accordingly, the method 400 is described below by way of example with reference thereto. However, it shall be appreciated that at least some of the operations of the method 500 may be deployed on various other hardware configurations and the method 500 is not intended to be limited to the monitoring system 110.

At operation 502, the unauthorized user detection component 210 detects presence of an unauthorized user in the physical environment based on the sensor data. The unauthorized user detection component 210 may use any of a variety and combination of types of sensor data, such as video, image, sound, motion data, and/or infrared data. Further, the unauthorized user detection component 210 may use any of a variety of techniques to detect the presence of an unauthorized user.

In some embodiments, the unauthorized user detection component 210 may determine a value based on the sensor data that indicates a degree or level of a detected change in the physical environment and compare the value or values to a threshold value to determine whether an unauthorized user is present. For example, the unauthorized user detection component 210 may use sensor data gathered by a motion sensor to determine a movement value indicating a level or degree of a detected movement in the physical environment. Similarly, the unauthorized user detection component 210 may use sensor data gathered by an infrared sensor to determine a to determine an infrared radiation value indicating a level or degree of a detected change in infrared radiation in the physical environment. As another example, the unauthorized user detection component 210 may use sensor data collected by multiple sensors 108 (e.g., video camera, microphone, motion sensor, infrared sensor, etc.) to determine an aggregate value indicating a degree or level of a detected change in the physical environment.

In any case, the unauthorized user detection component 210 compares the value determined based on the sensors data to a threshold value to determine whether the detected change indicates presence of an unauthorized user. For example, the unauthorized user detection component 210 determines that an unauthorized user is present when the value exceeds the threshold value and determines that an unauthorized user is not present when the value does not exceed the threshold value.

At operation 504, the operation mode modification component 212 causes a sensor to switch from an initial mode of operation to a modified mode of operation to collect sensor data. For example, the sensor can be adjusted to a modified mode of operation that provides a heightened level of performance, such as by increasing the resolution, using additional sensors, and the like. This allows for heightened performance when collecting valuable sensor data (e.g., when an unauthorized user is detected within the physical environment of the authorized user) while providing resource conserving performance when collecting less valuable sensor data (e.g., when there are no unauthorized users detected in the physical environment of the authorized user).

At operation 506, the resource restriction component 216 restricts access to an access-controlled resource. For example, the resource restriction component 216 may cause a window including sensitive information to close, cause an application to terminate, cause a user to be logged out of an account, obfuscate sensitive data, cause a door to lock, and the like.

At operation 508, the unauthorized user detection component 210 determines that the unauthorized user is no longer in the physical environment based on the sensor data. For example, the unauthorized user detection component 210 may determine that a detected change in the physical environment is no longer present and/or that a value determined based on updates sensor data is below the threshold value.

At operation 510, the operation mode modification component 212 causes the sensor to revert from the modified mode of operation to the initial mode of operation to collect sensor data. For example, the sensor 108 can be adjusted to the initial mode of operation that provides resource conserving performance.

At operation 512, the resource restriction component 216 resumes access to the access-controlled resource. For example, the resource restriction component 216 may log the authorized user into an account, reopen windows presenting sensitive data, clarify obfuscated data, unlock a door, and the like.

Software Architecture

Figure 6:
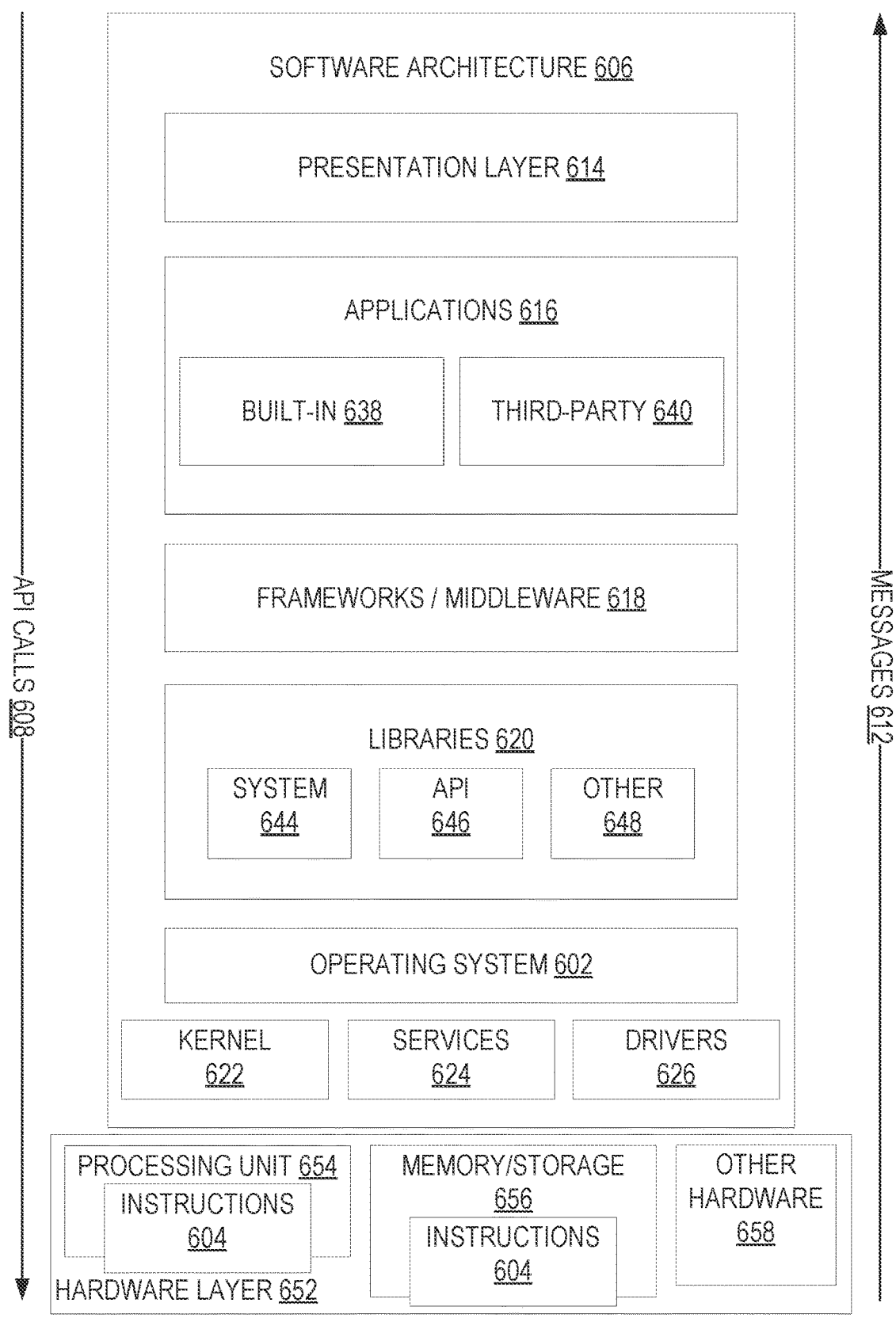
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
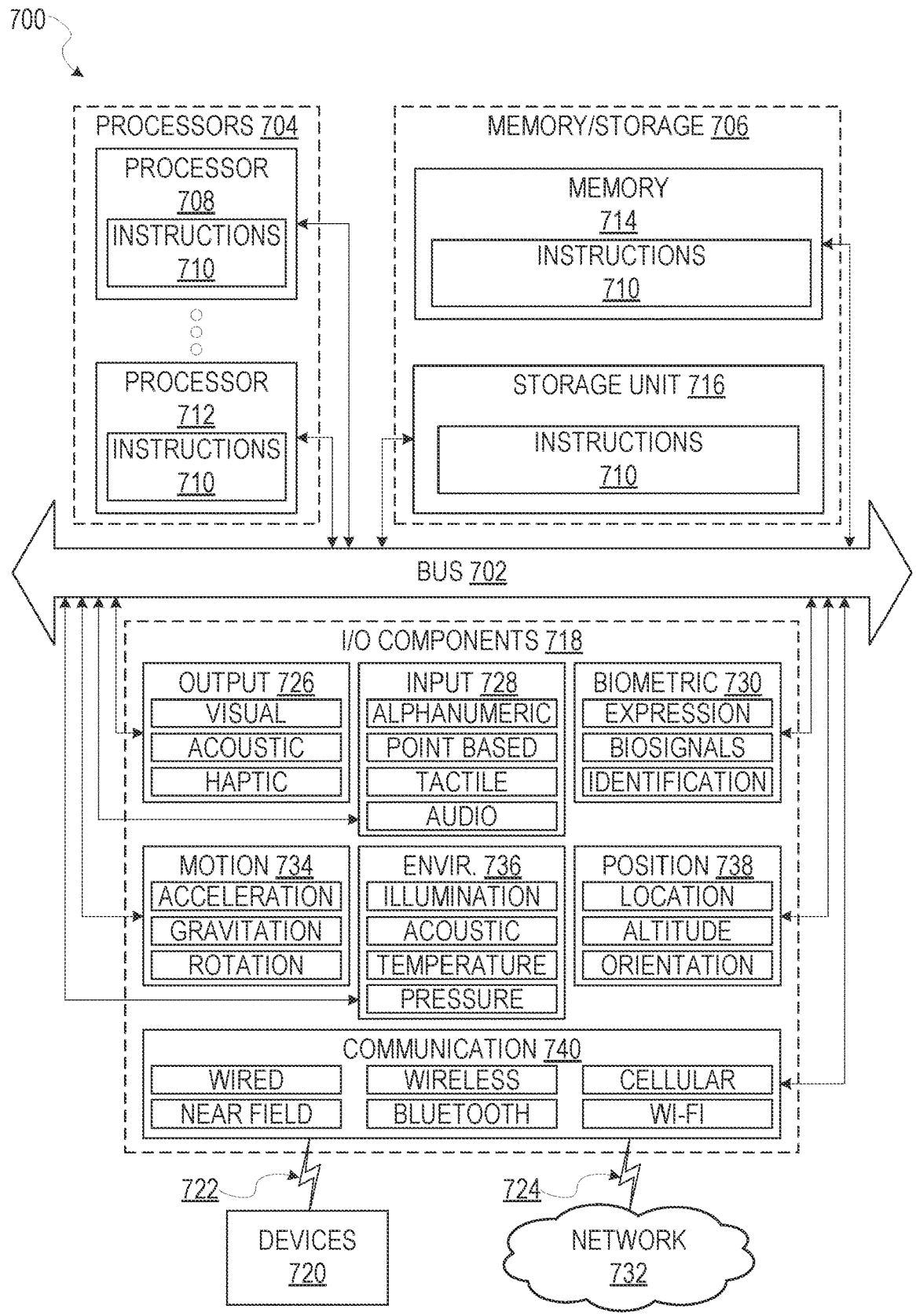
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102. A client device 102 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

Non-Limiting Examples

Example 1 is a system for modifying a mode of operation of one or more sensors using collected sensor data, the modifying being based on detection of additional users in a physical environment, the system comprising: means for providing a first user with access to an access-controlled resource in response to determining that an authorization requirement associated with the access-controlled resource has been satisfies; means for collecting sensor data describing a physical environment of the first user according to a first mode of operation, the first mode of operation defining an initial performance for at least one sensor used to collect the sensor data; means for detecting, based on the sensor data collected according to the first mode of operation, presence of a second user that is different than the first user in the physical environment of the first user; and means for causing the at least one sensor to switch from the first mode of operation to a second mode of operation in response to detecting the presence of the second user, wherein the second mode of operation is different than the first mode of operation, and the second mode of operation defines a revised performance for the at least one sensor used to collect the sensor data.

In Example 2, the subject matter of Example 1 includes, wherein the sensor data is thermal imaging data collected using a thermal imaging sensor and detecting the presence of the second user comprises: determining, based on the thermal imaging data, an occurrence of thermal energy that exceeds a threshold level of thermal energy.

In Example 3, the subject matter of Examples 1-2 includes, wherein causing the at least one sensor to switch from the first mode of operation to the second mode of operation comprises: modifying a resolution level of an optical sensor from a first resolution level to a second resolution level that is higher than the first resolution level.

In Example 4, the subject matter of Examples 1-3 includes, wherein causing the at least one sensor to switch from the first mode of operation to the second mode of operation comprises: modifying an optical view of an optical sensor from a first optical view capturing a first view of the physical environment to a second optical view capturing a second view of the physical environment, the second view being different than the first view.

In Example 5, the subject matter of Examples 1-4 includes, wherein the second view includes a first portion of the physical environment that is not included in the first view of the physical environment.

In Example 6, the subject matter of Examples 1-5 includes, wherein the second view of the physical environment is a subset of the first view of the physical environment.

In Example 7, the subject matter of Examples 1-6 includes, wherein causing the at least one sensor to switch from the first mode of operation to the second mode of operation comprises: initiating use of an optical sensor to collect video data, the optical sensor having not been used in the first mode of operation.

In Example 8, the subject matter of Examples 1-7 includes, means for determining, based on the sensor data collected according to the second mode of operation, that the second user is not present in the physical environment of the first user; and means for causing the at least one sensor to revert from the second mode of operation to the first mode of operation in response to determining that the second user is not present in the physical environment of the first user.

In Example 9, the subject matter of Examples 1-8 includes, means for determining, based on the sensor data collected according to the first mode of operation, a baseline status of the physical environment of the first user, wherein detecting the presence of the second user that is different than the first user in the physical environment is based on a detected change to the baseline status of the physical environment.

In Example 10, the subject matter of Examples 1-9 includes, means restricting access to the access-controlled resource in response to detecting the presence of the second user.

In Example 11, the subject matter of Examples 1-10 includes, means for causing presentation of an alert button that, when activated, causes transmission of an alert notification to a designated recipient.

Example 12 is a method for modifying a mode of operation of one or more sensors using collected sensor data, the modifying being based on detection of additional users in a physical environment, the method comprising: in response to determining that an authorization requirement associated with an access-controlled resource has been satisfies, providing a first user with access to the access-controlled resource; collecting sensor data describing a physical environment of the first user according to a first mode of operation, the first mode of operation defining an initial performance for at least one sensor used to collect the sensor data; detecting, based on the sensor data collected according to the first mode of operation, presence of a second user that is different than the first user in the physical environment of the first user; and in response to detecting the presence of the second user, causing the at least one sensor to switch from the first mode of operation to a second mode of operation, wherein the second mode of operation is different than the first mode of operation, and the second mode of operation defines a revised performance for the at least one sensor used to collect the sensor data.

In Example 13, the subject matter of Example 12 includes, wherein the sensor data is thermal imaging data collected using a thermal imaging sensor and detecting the presence of the second user comprises: determining, based on the thermal imaging data, an occurrence of thermal energy that exceeds a threshold level of thermal energy.

In Example 14, the subject matter of Examples 12-13 includes, wherein causing the at least one sensor to switch from the first mode of operation to the second mode of operation comprises: modifying a resolution level of an optical sensor from a first resolution level to a second resolution level that is higher than the first resolution level.

In Example 15, the subject matter of Examples 12-14 includes, wherein causing the at least one sensor to switch from the first mode of operation to the second mode of operation comprises: modifying an optical view of an optical sensor from a first optical view capturing a first view of the physical environment to a second optical view capturing a second view of the physical environment, the second view being different than the first view.

In Example 16, the subject matter of Examples 12-15 includes, wherein the second view includes a first portion of the physical environment that is not included in the first view of the physical environment.

In Example 17, the subject matter of Examples 12-16 includes, wherein the second view of the physical environment is a subset of the first view of the physical environment.

In Example 18, the subject matter of Examples 12-17 includes, wherein causing the at least one sensor to switch from the first mode of operation to the second mode of operation comprises: initiating use of an optical sensor to collect video data, the optical sensor having not been used in the first mode of operation.

In Example 19, the subject matter of Examples 12-18 includes, determining, based on the sensor data collected according to the second mode of operation, that the second user is not present in the physical environment of the first user; and in response to determining that the second user is not present in the physical environment of the first user, causing the at least one sensor to revert from the second mode of operation to the first mode of operation.

In Example 20, the subject matter of Examples 12-19 includes, determining, based on the sensor data collected according to the first mode of operation, a baseline status of the physical environment of the first user, wherein detecting the presence of the second user that is different than the first user in the physical environment is based on a detected change to the baseline status of the physical environment.

In Example 21, the subject matter of Examples 12-20 includes, in response to detecting the presence of the second user, restricting access to the access-controlled resource.

In Example 22, the subject matter of Examples 12-21 includes, causing presentation of an alert button that, when activated, causes transmission of an alert notification to a designated recipient.

Example 22 is a computing device for modifying a mode of operation of one or more sensors using collected sensor data, the modifying being based on detection of additional users in a physical environment, the computing device comprising: one or more hardware processors; a memory, storing instructions, which when executed, cause the one or more hardware processors to perform operations comprising: in response to determining that an authorization requirement associated with an access-controlled resource has been satisfies, providing a first user with access to the access-controlled resource; collecting sensor data describing a physical environment of the first user according to a first mode of operation, the first mode of operation defining an initial performance for at least one sensor used to collect the sensor data; detecting, based on the sensor data collected according to the first mode of operation, presence of a second user that is different than the first user in the physical environment of the first user; and in response to detecting the presence of the second user, causing the at least one sensor to switch from the first mode of operation to a second mode of operation, wherein the second mode of operation is different than the first mode of operation, and the second mode of operation defines a revised performance for the at least one sensor used to collect the sensor data.

In Example 23, the subject matter of Example 22 includes, wherein the sensor data is thermal imaging data collected using a thermal imaging sensor and detecting the presence of the second user comprises: determining, based on the thermal imaging data, an occurrence of thermal energy that exceeds a threshold level of thermal energy.

In Example 24, the subject matter of Examples 22-23 includes, wherein causing the at least one sensor to switch from the first mode of operation to the second mode of operation comprises: modifying a resolution level of an optical sensor from a first resolution level to a second resolution level that is higher than the first resolution level.

In Example 25, the subject matter of Examples 22-24 includes, wherein causing the at least one sensor to switch from the first mode of operation to the second mode of operation comprises: modifying an optical view of an optical sensor from a first optical view capturing a first view of the physical environment to a second optical view capturing a second view of the physical environment, the second view being different than the first view.

In Example 26, the subject matter of Examples 22-25 includes, wherein the second view includes a first portion of the physical environment that is not included in the first view of the physical environment.

In Example 27, the subject matter of Examples 22-26 includes, wherein the second view of the physical environment is a subset of the first view of the physical environment.

In Example 28, the subject matter of Examples 22-27 includes, wherein causing the at least one sensor to switch from the first mode of operation to the second mode of operation comprises: initiating use of an optical sensor to collect video data, the optical sensor having not been used in the first mode of operation.

In Example 29, the subject matter of Examples 22-28 includes, determining, based on the sensor data collected according to the second mode of operation, that the second user is not present in the physical environment of the first user; and in response to determining that the second user is not present in the physical environment of the first user, causing the at least one sensor to revert from the second mode of operation to the first mode of operation.

In Example 30, the subject matter of Examples 22-29 includes, determining, based on the sensor data collected according to the first mode of operation, a baseline status of the physical environment of the first user, wherein detecting the presence of the second user that is different than the first user in the physical environment is based on a detected change to the baseline status of the physical environment.

In Example 31, the subject matter of Examples 22-30 includes, in response to detecting the presence of the second user, restricting access to the access-controlled resource.

In Example 32, the subject matter of Examples 22-31 includes, causing presentation of an alert button that, when activated, causes transmission of an alert notification to a designated recipient.

Example 33 is at least one machine-readable medium including instructions that, when executed by processing circuitry, cause the processing circuitry to perform operations to implement of any of Examples 1-32.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for modifying a mode of operation of one or more sensors using collected sensor data, the modifying being based on detection of additional users in a physical environment, the system comprising:
   means for providing a first user with access to an access-controlled resource in response to determining that an authorization requirement associated with the access-controlled resource has been satisfied;
   means for collecting sensor data from a first sensor describing a physical environment of the first user according to a first mode of operation, the first mode of operation defining an initial active performance for the first and a second sensor used to collect the sensor data;
   means for detecting, based on the sensor data collected according to the first mode of operation, presence of a second user in the physical environment that is different than the first user in the physical environment; and
   means for causing the second sensor to switch from the first mode of operation to a second mode of operation in response to detecting the presence of the second user, wherein the second mode of operation is different than the first mode of operation, and the second mode of operation defines a revised active performance for the second sensor used to collect the sensor data.

2. The system of claim 1, wherein the sensor data is thermal imaging data collected using a thermal imaging sensor and detecting the presence of the second user comprises:
determining, based on the thermal imaging data, an occurrence of thermal energy that exceeds a threshold level of thermal energy.

3. The system of claim 1, wherein the means for causing the second sensor to switch from the first mode of operation to the second mode of operation comprises:
means for modifying a resolution level of an optical sensor from a first resolution level to a second resolution level that is higher than the first resolution level.

4. A method for modifying a mode of operation of one or more sensors using collected sensor data, the modifying being based on detection of additional users in a physical environment, the method comprising:
in response to determining that an authorization requirement associated with an access-controlled resource has been satisfied, providing a first user with access to the access-controlled resource;
collecting sensor data from a first sensor describing a physical environment of the first user according to a first mode of operation, the first mode of operation defining an initial active performance for at least one the first and a second sensor used to collect the sensor data;
detecting, based on the sensor data collected according to the first mode of operation, presence of a second user in the physical environment that is different than the first user in the physical environment; and
in response to detecting the presence of the second user, causing the at least one the second sensor to switch from the first mode of operation to a second mode of operation, wherein the second mode of operation is different than the first mode of operation, and the second mode of operation defines a revised active performance for the at least one second sensor used to collect the sensor data.

5. The method of claim 4, wherein the sensor data is thermal imaging data collected using a thermal imaging sensor and detecting the presence of the second user comprises:
determining, based on the thermal imaging data, an occurrence of thermal energy that exceeds a threshold level of thermal energy.

6. The method of claim 4, wherein causing the second sensor to switch from the first mode of operation to the second mode of operation comprises:
modifying a resolution level of an optical sensor from a first resolution level to a second resolution level that is higher than the first resolution level.

7. The method of claim 4, wherein causing the second sensor to switch from the first mode of operation to the second mode of operation comprises: modifying an optical view of an optical sensor from a first optical view capturing a first view of the physical environment to a second optical view capturing a second view of the physical environment, the second view being different than the first view.

8. The method of claim 7, wherein the second view includes a first portion of the physical environment that is not included in the first view of the physical environment.

9. The method of claim 7, wherein the second view of the physical environment is a subset of the first view of the physical environment.

10. The method of claim 4, further comprising:
determining, based on the sensor data collected according to the second mode of operation, that the second user is not present in the physical environment of the first user; and
in response to determining that the second user is not present in the physical environment of the first user, causing the second sensor to revert from the second mode of operation to the first mode of operation.

11. The method of claim 4, further comprising:
determining, based on the sensor data collected according to the first mode of operation, a baseline status of the physical environment of the first user, wherein detecting the presence of the second user that is different than the first user in the physical environment is based on a detected change to the baseline status of the physical environment.

12. The method of claim 4, further comprising:
in response to detecting the presence of the second user, restricting access to the access-controlled resource.

13. The method of claim 4, further comprising:
causing presentation of an alert button that, when activated, causes transmission of an alert notification to a designated recipient.

14. A computing device for modifying a mode of operation of one or more sensors using collected sensor data, the modifying being based on detection of additional users in a physical environment, the computing device comprising:
one or more hardware processors;
a memory, storing instructions, which when executed, cause the one or more hardware processors to perform operations comprising:
in response to determining that an authorization requirement associated with an access-controlled resource has been satisfied, providing a first user with access to the access-controlled resource;
collecting sensor data from a first sensor describing a physical environment of the first user according to a first mode of operation, the first mode of operation defining an initial active performance for at least one the first and a second sensor used to collect the sensor data;
detecting, based on the sensor data collected according to the first mode of operation, presence of a second user in the physical environment that is different than the first user in the physical environment; and
in response to detecting the presence of the second user, causing the at least one the second sensor to switch from the first mode of operation to a second mode of operation, wherein the second mode of operation is different than the first mode of operation, and the second mode of operation defines a revised active performance for the at least one second sensor used to collect the sensor data.

15. The computing device of claim 14, wherein the sensor data is thermal imaging data collected using a thermal imaging sensor and detecting the presence of the second user comprises:
determining, based on the thermal imaging data, an occurrence of thermal energy that exceeds a threshold level of thermal energy.

16. The computing device of claim 14, wherein causing the second sensor to switch from the first mode of operation to the second mode of operation comprises:
modifying a resolution level of an optical sensor from a first resolution level to a second resolution level that is higher than the first resolution level.

17. The computing device of claim 14, wherein causing the second sensor to switch from the first mode of operation to the second mode of operation comprises: modifying an optical view of an optical sensor from a first optical view capturing a first view of the physical environment to a second optical view capturing a second view of the physical environment, the second view being different than the first view.

18. The computing device of claim 14, wherein causing the second sensor to switch from the first mode of operation to the second mode of operation comprises: initiating use of an optical sensor to collect video data, the optical sensor having not been used in the first mode of operation.

19. The computing device of claim 14, wherein the operations further comprise:
    determining, based on the sensor data collected according to the first mode of operation, a baseline status of the physical environment of the first user, wherein detecting the presence of the second user that is different than the first user in the physical environment is based on a detected change to the baseline status of the physical environment.

* * * * *